United States Patent [19]
Stoll

[11] Patent Number: 6,067,777
[45] Date of Patent: May 30, 2000

[54] PROTECTIVE WRAPPING MADE OF A PLASTIC FOIL FOR A VEHICLE SEAT AS WELL AS PROCESS FOR WRAPPING THE LATTER

[75] Inventor: Dieter Stoll, Boeblingen, Germany

[73] Assignee: DaimlerChrysler AG, Germany

[21] Appl. No.: 09/223,023

[22] Filed: Dec. 30, 1998

[30] Foreign Application Priority Data

Oct. 5, 1998 [DE] Germany .............. 198 45 661

[51] Int. Cl.⁷ .............................. B65B 53/02
[52] U.S. Cl. ............... 53/442; 53/469; 297/219.1; 297/228.1; 206/497
[58] Field of Search .............. 297/218.1, 218.4, 297/219.1, 228.1; 206/497; 53/442, 557, 461, 465, 469, 473

[56] References Cited

U.S. PATENT DOCUMENTS

| | | | |
|---|---|---|---|
| 3,695,692 | 10/1972 | Williams | 297/229 |
| 4,400,030 | 8/1983 | Maruzzo et al. | 297/219.1 |
| 4,884,839 | 12/1989 | Keiswetter | 297/219.1 |
| 5,028,472 | 7/1991 | Gray | 297/218.1 |
| 5,655,813 | 8/1997 | Kirkpatrick | 297/228.1 |
| 5,716,096 | 2/1998 | Pryde et al. | 297/228.1 |
| 5,803,539 | 9/1998 | Dewar et al. | 297/228.1 |

FOREIGN PATENT DOCUMENTS

| | | |
|---|---|---|
| 0 457 992 B1 | 11/1991 | European Pat. Off. . |
| 0 564 872 B1 | 10/1993 | European Pat. Off. . |
| 0 765 778 A2 | 4/1997 | European Pat. Off. . |
| 41 32 714 C1 | 12/1992 | Germany . |
| 43 33 051 C1 | 11/1994 | Germany . |

*Primary Examiner*—Linda Johnson
*Attorney, Agent, or Firm*—Evenson, McKeown, Edwards & Lenahan, P.L.L.C.

[57] ABSTRACT

A protective wrapping for a vehicle seat includes a separate protective wrapping for the backrest cushion and a separate protective wrapping for the seat cushion. The backrest cushion wrapping includes a protective bag that loosely encloses the backrest cushion from above on all sides the backrest cushion to the level of the seat surface. By means of a closing tongue that reaches around the backrest underside from the front to the rear, the protective bag is fixed on the backrest cushion. The seat cushion wrapping includes a protective hood that encloses the seat cushion from above on all sides. The sides are gathered in a circular manner, particularly shrunk, below the seat cushion, so that the seat cushion wrapping rests under pre-stress laterally on the seat cushion.

19 Claims, 5 Drawing Sheets

PROTECTIVE WRAPPING MADE OF A PLASTIC FOIL FOR A VEHICLE SEAT AS WELL AS PROCESS FOR WRAPPING THE LATTER

BACKGROUND AND SUMMARY OF THE INVENTION

This application claims the priority of German Patent Application No. 198 45 661.1, filed Oct. 5, 1998, the disclosure of which is expressly incorporated by reference herein.

The present invention relates to a protective wrapping consisting of a plastic foil for a vehicle seat as well as to a process for wrapping a vehicle seat in a protective wrapping.

During the assembly of vehicles, and also on the way from the automobile manufacturer by way of the wholesaler to the ultimate buyer, vehicle seats are repeatedly subjected to the danger of becoming dirty because workers frequently sit in the vehicle for the purpose of carrying out mounting and control work or for logistically caused drives. Thus, dirt can be brought onto the seats unnoticed by dirty work clothing or dirty hands. The situation is similar during servicing work in the customer service field.

For preventing the seats from becoming dirty during the series-type assembly of a vehicle, at least the driver seat is provided with a protective wrapping that can be used once, because this seat is used particularly frequently. In the customer service field, in addition to protective wrappings, which can be used once, protective covers are used which require higher expenditures and can be used several times. Because of the only one-time use of the wrappings, their cost should be as reasonable as possible. On the other hand, they should provide an effective and durable protection and should not slide or be damaged because of frequent entering and exiting.

One-piece protective covers are customary for this application. A continuous foil layer (i.e., a so-called front layer) is provided which covers both the seat surface and the backrest together. At the ends of the front layer, pockets are mounted which, on the top side, reach around the backrest and, on the front side, reach around the seat cushion to the backrest side or to the seat underside. For preventing or reducing the tendency of the protective cover to slide on the cushioning, strip-shaped adhesive layers are known which are glued onto the interior side (compare European Patent Document EP 457 992 B1). Additionally, the foil of the front layer is constructed as a multi-layer coextrudate, the foil layer facing the cushioning having a high coefficient of friction, and the exposed foil layer having a low coefficient of friction (compare European Patent Document EP 765 778 A2). For a better protection of the seat despite sliding, the pockets can change laterally into one another and reach around the seat also laterally in the transition area from the seat cushion to the backrest (compare DE 41 32 714 C1).

In order to permit an automated handling of the protected seats by means of an industrial robot (for gripping the seat, the robot reaches by means of a plate into the gap between the lower edge of the backrest and the seat cushion) in the area of the mentioned gap, a wider pocket is formed by means of the front layer, which pocket projects deeply into the gap. The handling tool of the robot can dip into this pocket without damaging the protective cover or directly touching the cushioning cover. Simultaneously, the pocket clamped into the gap between the backrest and the seat cushion also has the purpose of stabilizing the position of the protective cover on the seat (compare German Patent Document DE 43 33 051 C1). However, according to the applicant's experiences, this does not result in a sufficient fixing of the protective wrapping on the seat.

European Patent Document EP 564 872 B1 also states that it is known, although no sources are indicated, to shrink the cushioning parts of a vehicle seat each separately into the shrinking foil at the seat manufacturing facility before the final assembly of the seat. Although this has the advantage of an early protection and a no-slide hold of the protective foil on the cushioning and permits a robotic handling of the vehicle seats without damaging the wrapping, it is stated that this separate shrinking-in of the backrest cushion and of the seat cushion entails the risk of a condensation of trapped moisture and solvents which may result in the formation of spots and color changes in the fabric of the cover. By means of the tight wrapping of the cushioning into the plastic foil, an air exchange between the cushioning and the environment immediately after the manufacturing of the cushioning is prevented for a fairly long time so that the applicant's observations have confirmed the above-mentioned danger.

It is an object of the present invention to provide a protective covering having the following advantages: the protective wrapping should be mounted economically and at reasonable cost; it should offer an early protection and not slide when used; it should permit robotic handling of vehicle seats without the danger that the wrapping may be damaged; and there must be no risk of a formation of spots or of a local color change.

On the basis of the above-mentioned protective wrapping, this object is achieved according to the present invention. Accordingly, a separate protective covering is provided for the backrest cushion and for the seat cushion. The backrest cushion wrapping consists of a shape-adapted protective bag which loosely encloses the backrest cushion from above on all sides to the level of the seat surface. By means of a closing tongue which reaches around the backrest underside from the front to the rear, the protective bag is fixed on the backrest cushion in a secure manner with respect to sl ding. The free end of the closing tongue is glued to the rear-side foil of the backrest cushion wrapping. The seat cushion wrapping consists of a protective hood which is adapted by tailoring and which encloses the seat cushion from above on all sides. The sides are circularly gathered, particularly shrunk, below the seat cushion so that the seat cushion wrapping rests with a pre-stress laterally against the seat cushion.

The protective wrapping is formed by reasonably priced components. The wrapping of the backrest cushion is form-lockingly and securely fixed on the backrest cushion and is thus protected against sliding. The loose fit in the backrest area ensures an air exchange and avoids condensate formations on the interior side of the foil. Despite a martial shrinking-on of the seat cushion wrapping, this wrapping spans the seat surface at a distance and permits an exchange also in this case. A reaching of a robot handling system into the gap between the backrest and the seat cushion is not prevented.

Other objects, advantages and novel features of the present invention will become apparent from the following detailed description of the invention when considered in conjunction with the accompanying drawings.

DETAILED DESCRIPTION OF THE DRAWINGS

Figure 1:
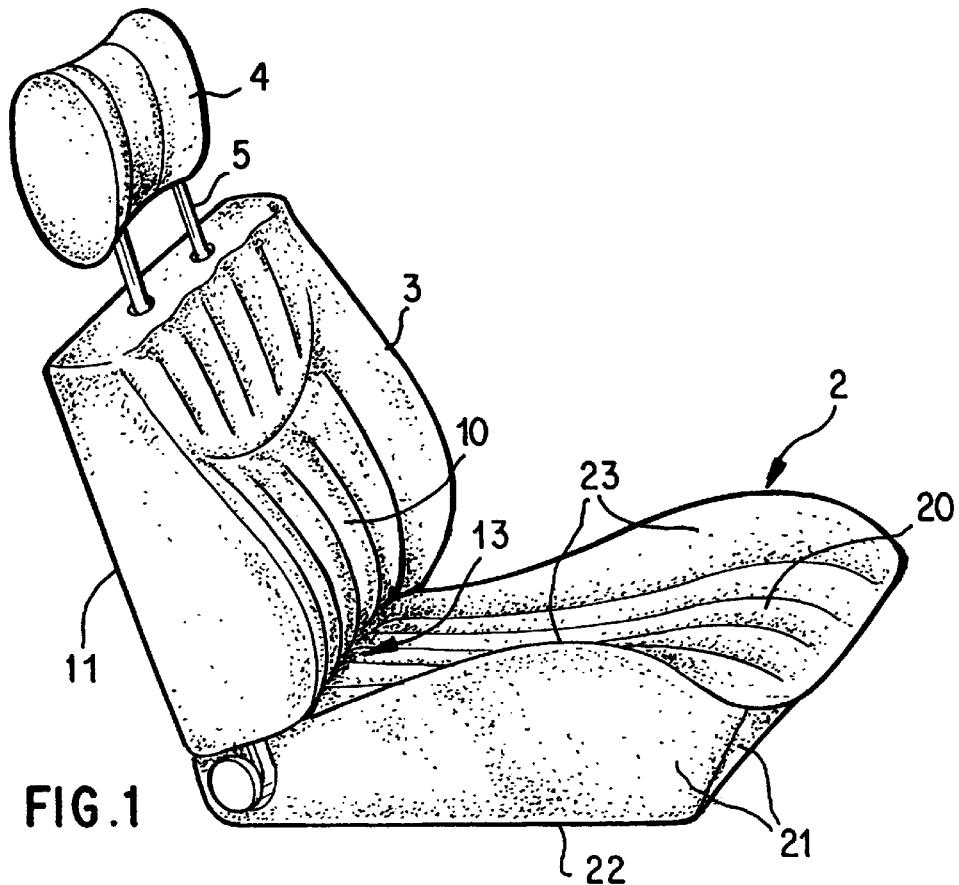
FIG. 1 is a diagonal view of an unwrapped vehicle seat.
Figure 5:
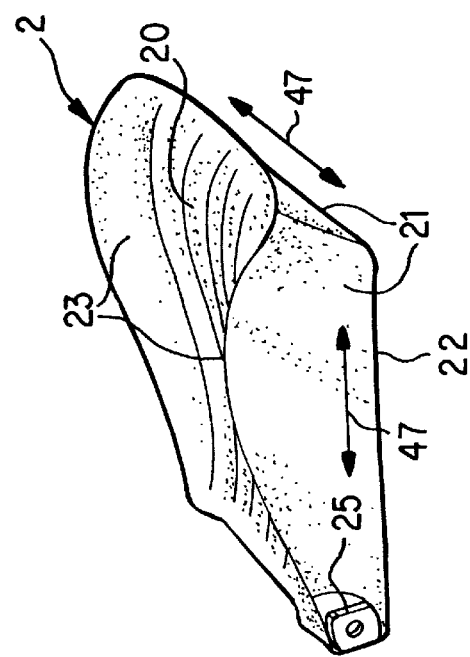
FIG. 5 is an individual diagonal view of the seat cushion to be wrapped.
Figure 11:
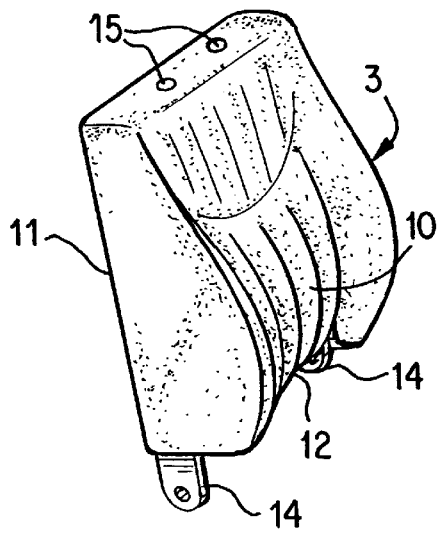
FIG. 11 is an individual diagonal view of the unwrapped backrest cushion.

FIG. 1 illustrates a complete vehicle seat in the unwrapped condition. It comprises an individual seat cushion 2 which is shown separately in FIG. 5, with the seat surface 20, and with the lateral so-called seat bottom 21, which reaches to the lower edge 22 of the seat cushion. On the top side, side guiding cushions 23 are shaped to the seat cushion on the right and on the left and extend in the longitudinal direction of the seat cushion. The separate backrest cushion 3, which is shown separately in FIG. 11 and has the front side 10 and the rear side 11, is connected with the seat cushion 2 by way of seat-cushion-side mountings 25 and backrest-side mountings 14. Accordingly, in the area of the underside 12 of the backrest cushion, a continuous gap 13 is situated between the backrest cushion and the seat cushion. On the top side of the backrest cushion, two small openings 15 are provided behind which guiding elements are situated in the interior of the backrest. They are used for receiving the guide rods 5 of the headrest 4 which is held on the backrest in a vertically changeable manner.

In order to be able to jointly achieve all abovementioned advantages by means of a protective wrapping for such a vehicle seat (e.g., early protection; mountable in an economical manner at reasonable cost; protected against sliding; suitable for robots; and rearward ventilation), one separate protective wrapping 30' is provided for the backrest cushion 3 and another 40' is provided for the seat cushion 2, which will be described in detail.

Figure 10:
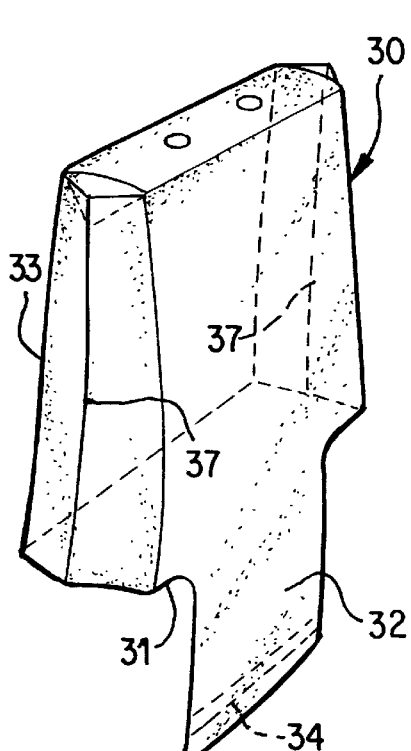
FIGS. 8, 9 and 10 are a view of the flat side (FIG. 8); a view of the narrow side (FIG. 9) and a diagonal view in the upright condition (FIG. 10) of the protective bag for the backrest cushion.
Figure 9:
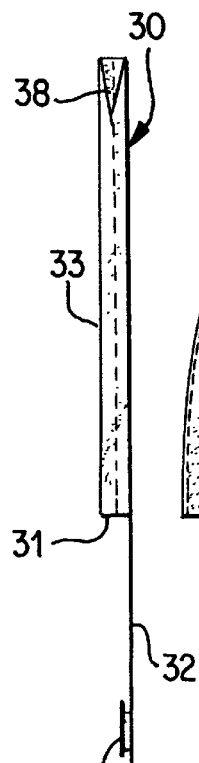
Figure 8:
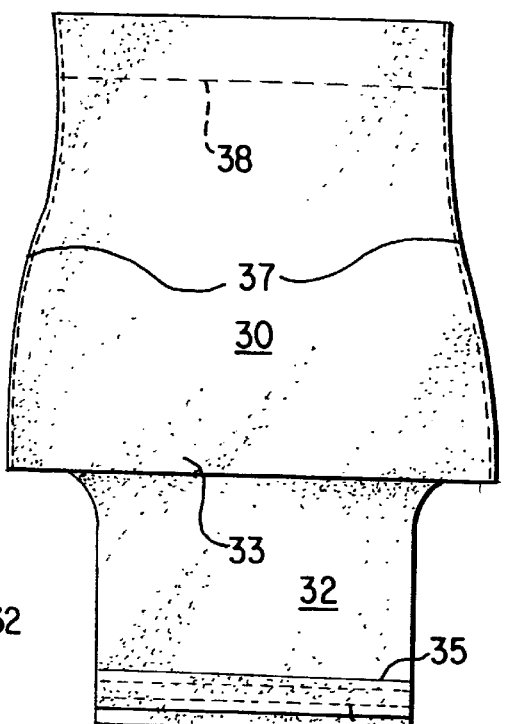
Figure 12:
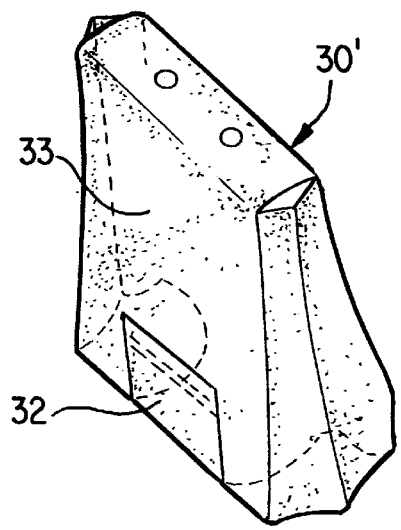
FIG. 12 is a view of the finished wrapped individual backrest cushion.

The backrest cushion wrapping 30' (the wrapped backrest cushion is illustrated in FIG. 12) consists of a protective back 30 which, which respect to the shape and the size, is adapted to the backrest cushion 3 and which surrounds the backrest cushion 3 from above on all sides, thus also in the area of the backrest back side 11 at least to the level of the seat surface 20. The protective bag 30 is shown separately in the different views of FIGS. 8 to 10. For improving the protective effect of the wrapping and the protection against sliding, it is advantageous for the lower edge 31 to reach partially around the backrest underside 12 at least on the backrest front side 10 and thus to reach into the gap 13 on the mounted vehicle seat. At the lower edge 31 of the frontal bag side, a closing tongue 32 is provided. It is wound around the backrest underside 12 onto the rearward bag side 33 and is glued there with a slight pre-stress. When the vehicle seat is mounted, the closing tongue extends from the front through the gap 13 between the backrest cushion and the seat cushion toward the rear. The glued-on closing tongue is situated in a protected area and is therefore neither touched during the entering or exiting, nor during handling by a robot.

When the backrest cushion wrapping 30' is placed, the foil of the protective bag must not surround the backrest cushion too tightly; it must rest on it loosely, that is without any tensile stress, so that a rearward ventilation of the foil is still possible and possible exhalations of the cushion can escape into the open air and will not condense on the interior side on the wrapping.

The protective bag for the backrest wrapping may consist of a reasonably priced, non-shrinkable foil. In the embodiment of the protective bag 30 and of the backrest cushion wrapping illustrated in FIGS. 8 to 10, 12 and 13, the protective bag is provided with welded side seams 37 in the manner of a shopping bag. In addition, it has an expansion fold 38 in the area of the bag bottom assigned to the upper edge of the backrest. Because of this type of design, the protective bag can be produced at reasonable cost as a mass-produced article on existing machines for the production of plastic bags. The through-openings for the guiding rods 5 of the headrests in the bag bottom can optionally be carefully punched free only as required, for example, during the inserting of the headrests, by means of a pointed knife or can be punched out in the manufacturing facility of the bag.

In the illustrated embodiment, the gluing of the closing tongue 32 to the rear-side foil 33 of the backrest cushion wrapping 30' is caused by a self-adhesive strip 34 which is adhesive on both sides and which is at first protected by a cover strip 35. A strip-shaped coating of a self-adhesive can also be provided directly on the bag foil. After the cover strip is pulled off the self-adhesive strip applied to the closing tongue, the closing tongue must only still be placed against the back side of the wrapping and be pressed on in the area of the self-adhesive strip.

Figure 13:
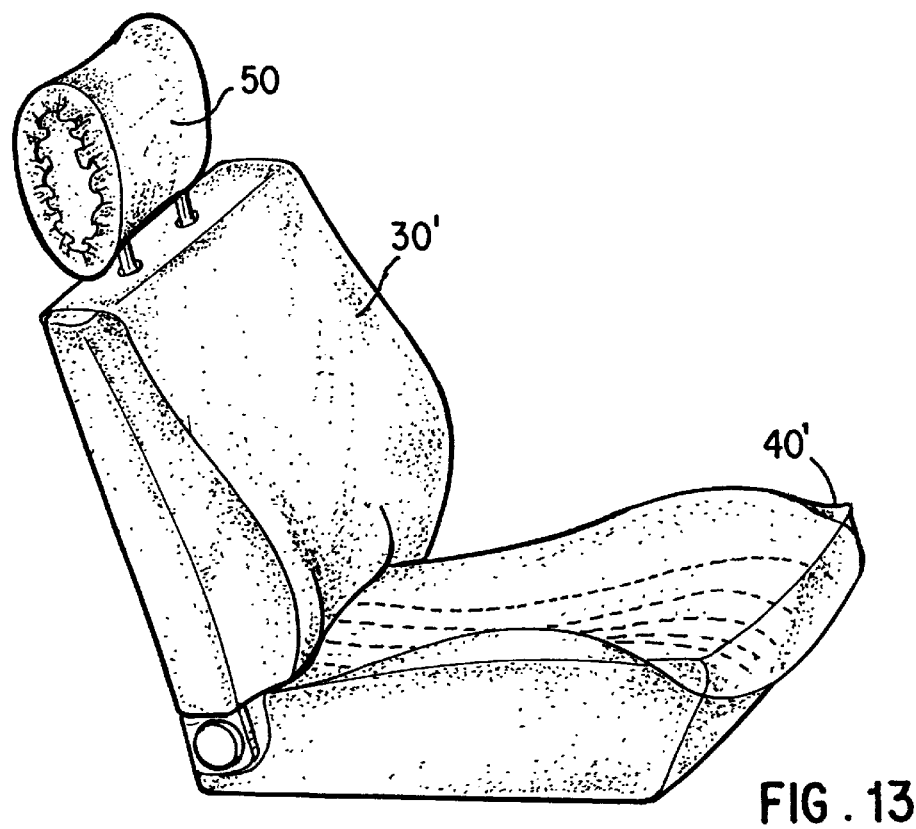
FIG. 13 is a diagonal view of the complete vehicle seat in the wrapped condition.

The headrest 4 may be wrapped into a single foil strip which is wider than the headrest and whose ends are fixed on one another by means of an adhesive strip. At one point, the foil strip may have two punched-free through holes for the guiding rods. In order to be able to better secure the wound-around foil on the headrest, this foil can be circularly gathered on the faces of the headrest by means of thermal shrinking, as indicated in FIG. 13 in the case of the headrest wrapping 50. In order to permit this, a shrinkable foil may be used in which the direction of the highest shrinking capacity (approximately 50%) is in the circumferential direction of the headrest or in the longitudinal direction of the wound foil strip.

Figure 14:
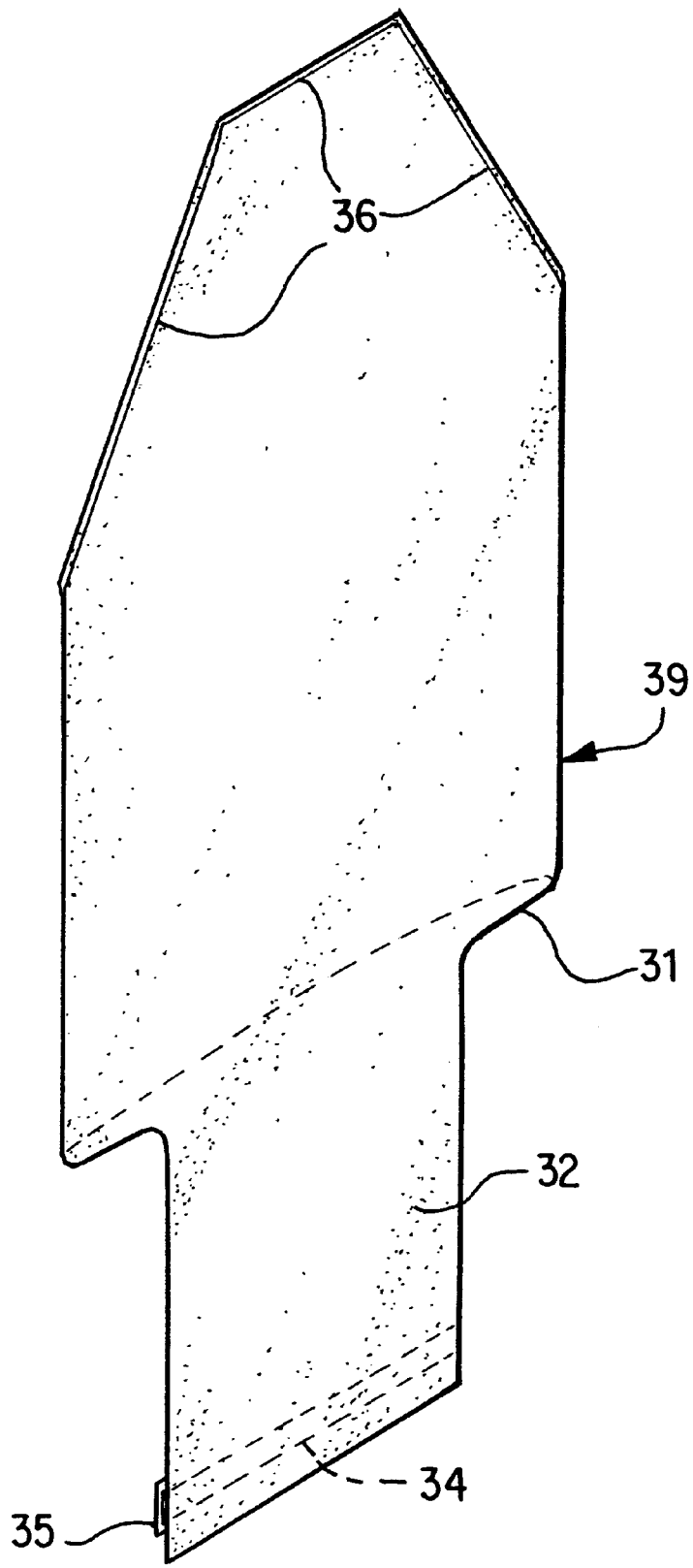
FIG. 14 is a view of a modification of the protective bag for the joint wrapping of the backrest cushion and the headrest.

The protective bag 39, which is illustrated in FIG. 14 as a further embodiment, has no expansion folds. It is formed directly from a flat-placed foil hose and therefore also has no lateral seams but is closed only in the bottom area by welded seams 36. In order to be able to directly include also the headrest into the protective bag, the bottom is welded in a trapezoidal manner.

The design of the seat cushion wrapping 40' is not as simple as that of the backrest cushion wrapping. For the wrapping of the seat cushion, a protective hood 40 is provided which is adapted by tailoring to the shape and the size of the seat cushion 2. The protective hood 40 must first be sewn together from cut parts 43 and 44 of a plastic foil, which have a certain shape, along seams 41 which have a defined course. A sufficiently strong and tear-resistant foil of a thickness of approximately 100 μm is used which can easily be sewn. Other connection techniques, such as welding or gluing, would also be suitable for a durable joining of the cut-to-size pieces.

The shape-adapted protective hood, which is prefabricated in such a manner, has undercuts corresponding to the shape of the seat cushion. It is pulled onto the seat cushion 2 from above so that it encloses it on all sides, particularly also on the rear side of the so-called seat bottom 21. On the underside 22 of the seat cushion, the sides of the completely pulled-on protective hood first protrude downward by means of a projection 48. This projection is then circularly gathered below the seat cushion so that the foil of the seat cushion wrapping 40' rests at least in the area of the seat bottom 21 under a defined pre-stressing laterally against the seat cushion 2. During this gathering, it has to be taken into account that the tensile stress in the foil of the seat cushion wrapping spanning the seat surface 20 is less in the longitudinal direction than in the transverse direction. As the result, the foil spans the two lateral guiding cushions 23 tangentially from the left to the right and has a distance to the center part of the seat surface 20 so that a good rearward ventilating of the foil and a venting of the cushion are possible. At the points of the mountings 25 for connecting the seat cushion 2 with the backrest cushion 3, the foil of the pulled-on protective hood 40 is carefully recessed, for example, cut free, so that the mounting parts are accessible for the mounting operation.

The above-mentioned gathering of the edge of the protective hood projecting on the bottom can basically take place in different manners, for example, by a crosswise pulling-in of several tension pulls spanning the cushion underside or by a ring-shaped string pull similar to that of a tobacco pouch. However, this would require a lot of manual work and would therefore be less suitable for a mass production. In order to be able to automate the gathering operation, the shrinking technique is used here which is known from packaging technology. For this reason, at least the cut-to-size piece 44 of the protective hood assigned to the seat bottom 21 consists of a shrinkable foil 45.

Figure 2:
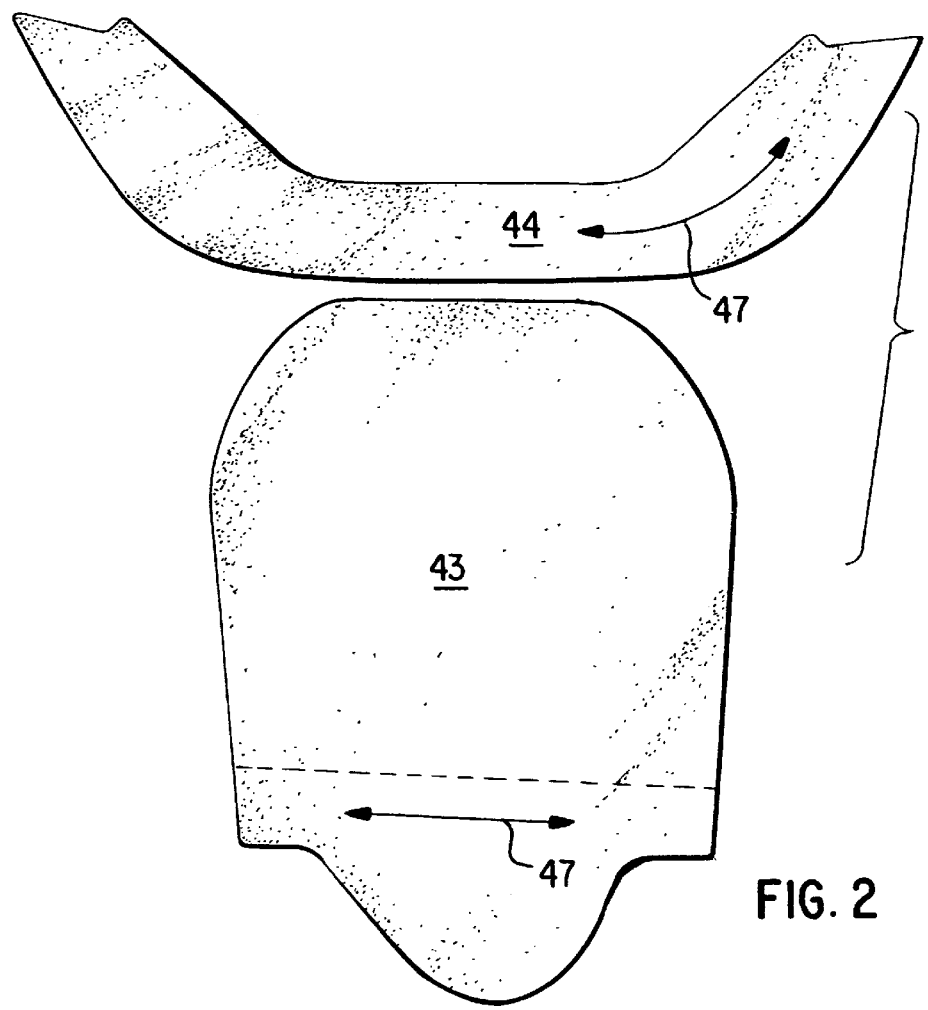
FIG. 2 is a joint representation of the cut-to-size parts for the protective hood of the seat cushion arranged in the correct position.
Figure 3:
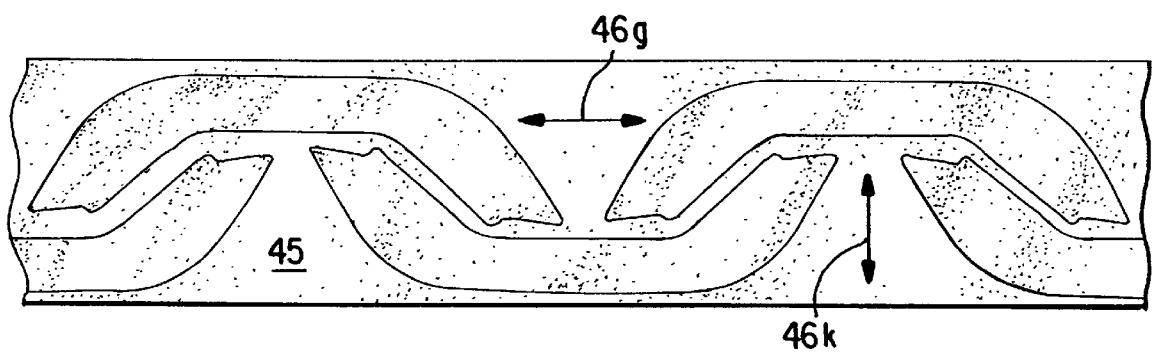
FIG. 3 is a view of the arrangement of the cut-to-size parts, which are assigned to the seat bottom, on the shrinking foil web from which they are cut.
Figure 6:
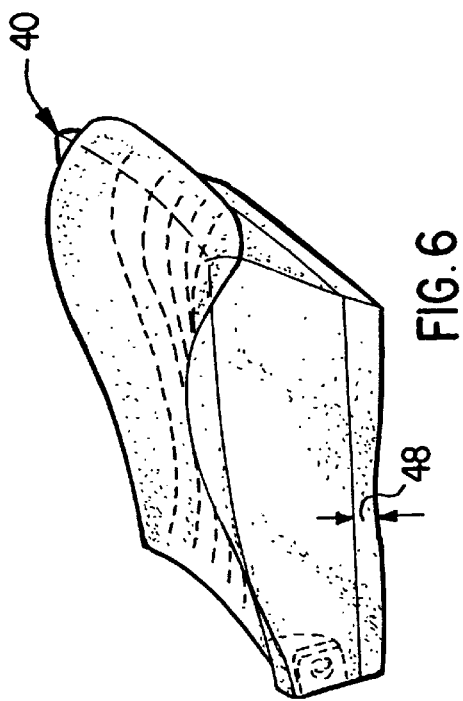
FIG. 6 is an individual diagonal view of the seat cushion which is not completely wrapped with the protective hood according to FIG. 4.
Figure 7:
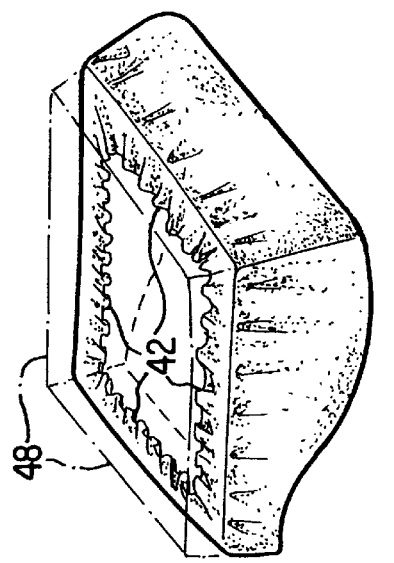
FIG. 7 is a view of the condition after the partial shrinking-on of the lower edge of the protective hood for forming the circular gathering.
Figure 4:
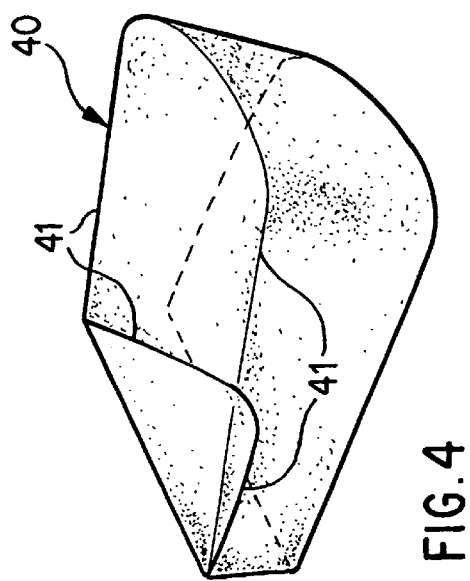
FIG. 4 is a diagonal view of the finished sewn protective hood of the seat cushion.

FIG. 2 shows all cut-to-size pieces for the protective hood in an arrangement in which they can later be sewn together. The cut center piece 43 is assigned to the seat surface which must be shrunk only in the rearward part. The cut-to-size piece 44 assigned to the seat bottom must be shrunk in the circumferential direction of the seat bottom and therefore consists of a shrinkable foil. The cut-to-size pieces 44 are cut according to the correct position out of a foil web (FIG. 3) with an anisotropic shrinking capacity. The direction 46g of the largest shrinking capacity of the foil web 45 is in the web direction. In this direction, the maximal shrinkage is at least 30%, preferably approximately 50%. In the direction 46k of the smallest shrinking capacity situated transversely to the web, the foil can shrink by no more than approximately 10%. The cut-to-size pieces 44 of the seat bottom covering are cut out of the foil web such that the circumferential direction 47 of the seat bottom coincides approximately with the direction 46g of the largest shrinking capacity of the foil web 45. The cut-to-size piece 43, which is assigned to the seat surface and which carries a strip in the rear portion, which strip is assigned to the rear portion of the seat bottom, is to be shrunk there locally in the circumferential direction 47 of the seat bottom. Accordingly, the cut-to-size pieces 43 are cut out of a shrinkable foil web such that the direction 47 indicated in FIG. 2 for this cut-to-size piece 43 coincides with the direction 46g of the highest shrinking capacity of the foil web.

A protective hood 40 produced in this manner can be thermally shrunk and circularly gathered in the area of the underside projection 48 in a manner which is economical and can be automated. In a first manual expansion stage of the process, the applicant had used an efficient, manually guidable hot-air blower with a power of 10 kW from the Swiss firm LEISTER. It generates hot air of a temperature of approximately 650° C. at the outlet point and delivers 1 m³ hot air per minute at a delivery pressure of approximately 12 hPa. The hot-air blower was guided at such a distance from the foil that the foil was heated by the hot air within a few seconds to a shrinkage temperature of 280 to 300° C. In an externally modified form, this hot-air blower may also be used as a robot-guided blower which is provided for a later expansion stage of the process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A protective wrapping for a vehicle seat comprising a seat cushion and a backrest cushion, said wrapping comprising:

a protective wrapping for the backrest cushion comprising a protective bag that encloses the backrest cushion from above on all sides at least to the surface of the seat cushion, wherein a front side wall of the protective bag corresponding to a front side of the backrest cushion has a closing tongue at a lower edge of the front side wall, wherein the closing tongue extends through a gap between the backrest cushion and the seat cushion to the protective bag side corresponding to a rear side of the backrest cushion and is connected to the rear side of the backrest cushion, wherein the protective bag surrounds the backrest cushion without tensile stress; and a protective wrapping for the seat cushion consisting of a protective hood comprising plastic foil pieces joined together and enclosing the seat cushion from above on all sides except the underside, the protective hood having side walls circling the seat cushion and partially protruding at the underside of the seat cushion, said protruding part of the side walls being circularly gathered below the seat cushion, wherein at least the sides of the protective hood in an area of the seat bottom rest under pre-stress against the seat cushion and a part of the protective hood spanning an upper seat surface of the seat cushion has a tensile stress in a longitudinal direction that is less than that in a transverse direction.

2. A protective wrapping according to claim 1, wherein the closing tongue further comprises an adhesive strip and a protective strip.

3. A protective wrapping according to claim 1, wherein the plurality of pieces joined together are sewn together.

4. A protective wrapping according to claim 1, wherein the protective bag comprises a non-shrinkable foil.

5. A protective wrapping according to claim 1, wherein the protective bag further comprises at least one of welded side seams and bottom seams.

6. A protective wrapping according to claim 1, wherein the protective bag further comprises welded side seams and an expansion fold in an area of the protective bag corresponding to an upper edge of the backrest cushion.

7. A protective wrapping according to claim 1, wherein the closing tongue is connected to the protective bag corresponding to a rear side of the backrest cushion by a self-adhesive strip having glue on both sides or by a strip-shaped coating of a self-adhesive bonding agent.

8. A protective wrapping according to claim 1, wherein at least the pieces of the protective hood corresponding to the seat bottom comprise a shrinkable foil having a shrinking capacity in the circumferential direction of the seat bottom of at least 30%.

9. A protective wrapping according to claim 8, wherein the shrinking capacity is at least 50%.

10. A protective wrapping according to claim 1, wherein the protective wrapping for the seat cushion is recessed at points corresponding to mountings for connecting the seat cushion with the backrest cushion.

11. A protective wrapping according to claim 1, wherein the tensile stress of a part of the protective hood spanning the seat surface is less in the longitudinal direction than in the transverse direction, thereby spanning two lateral guiding cushions tangentially and having a distance to a center part of the seat surface.

12. A protective wrapping according to claim 1, wherein a shrinking capacity of the pieces corresponding to the seat bottom is approximately 50% in parallel to a lower edge of the seat cushion and is approximately 10% transversely to the lower edge of the seat cushion.

13. A protective wrapping according to claim 1, wherein the at least one of the protective bag and the protective hood has a thickness of approximately 100 μm.

14. A process for wrapping a vehicle seat comprising a seat cushion and a backrest cushion, comprising:

enclosing the backrest cushion from above on all sides at least to a surface of the seat cushion with a protective bag having a front side wall corresponding to a front side of the backrest cushion having a closing tongue at a lower edge of said front side wall;

fixing the protective bag on the backrest cushion by directing the closing tongue around a lower edge of the backrest cushion and to a side of the protective bag corresponding to a rear side of the backrest cushion and connecting the closing tongue to the rear side of the backrest cushion, whereby the protective bag surrounds the backrest cushion without tensile stress;

tailoring a protective hood to a shape and size of the seat cushion by cutting and joining plastic foil pieces;

enclosing the seat cushion from above on all sides except the underside with the protective hood, thereby encircling all sides of the seat cushion by side walls of the protective hood, wherein the side walls partially protrude at the underside of the seat cushion;

fixing the protective hood on the seat cushion by gathering the protruding part of the side walls in a circumferential direction below the seat cushion, wherein a part of the protective hood spanning an upper seat surface of the seat cushion has a tensile stress in a longitudinal direction that is less than that in the transverse direction; and assembling the separately enclosed backrest cushion and the enclosed seat cushion to each other into a single seat.

15. A process according to claim 14, wherein the connecting of the closing tongue is by gluing.

16. A process according to claim 14, wherein the plastic foil pieces of the protective hood are joined together by sewing.

17. A process according to claim 14, further comprising:

cutting the plastic foil pieces corresponding to the seat bottom from a foil web, wherein a direction of the highest shrinking capacity of the foil web is in approximately the circumferential position of the seat bottom; and thermally shrinking the cut plastic foil pieces, thereby circularly gathering part of the protective hood below the seat cushion.

18. A protective wrapping according to claim 1, wherein said protective wrapping is for a one-time use.

19. A process for wrapping a vehicle seat according to claim 14, wherein the seat cushion and the backrest cushion are initially separate.

* * * * *